May 1, 1923.

A. B. NORWALK

TIRE VALVE

Filed Jan. 3, 1918

1,453,721

INVENTOR
Albert B. Norwalk
BY
Williams & Pritchard
ATTORNEYS

Patented May 1, 1923.

1,453,721

UNITED STATES PATENT OFFICE.

ALBERT B. NORWALK, OF NEW YORK, N. Y., ASSIGNOR OF ONE-HALF TO CONRAD HUBERT, OF WHITE PLAINS, NEW YORK.

TIRE VALVE.

Application filed January 3, 1918. Serial No. 210,134.

*To all whom it may concern:*

Be it known that I, ALBERT B. NORWALK, a citizen of the United States, residing in the borough of Manhattan, city of New York, in the county of New York, State of New York, have invented certain new and useful Improvements in Tire Valves, of which the following is a specification, reference being had therein to the accompanying drawings, forming part thereof.

My invention relates to tire valves and relates more particularly to that type or kind of tire valve in which a screw-threaded swivel member, such as a tubular plug, is rotatively connected to a non-rotative tubular sealing member having a valve seat, commonly at the inner end thereof, upon which a valve head is seated by a valve-closing spring. The principal object of my invention is to secure a tight seal together with the protection of the valve-closing spring. Other objects and advantages will hereinafter appear.

My present invention may be considered as a further development of and improvement upon the tire valve which forms the subject of my Patent No. 1,223,344 of April 17, 1917. Also my present invention may be considered as an improvement upon another form of tire valve which heretofore has been in extensive use, and known as the "Schrader" valve. In my above mentioned patented tire valve, the complete housing and protection of the valve-closing spring is effectively provided for, but in this patented construction there is a longitudinally rigid swivel connection between an outer screw-threaded plug member and a tubular sealing member having a long bearing sleeve at its outer end which houses the spring and which is journaled in and is substantially coterminous with the outer end of the screw-threaded plug member. However, a longitudinally rigid swivel connection between the tubular plug member and the tubular sealing member has been found undesirable, in that the seating of a ring of packing material carried by the sealing member upon a usual seat or sealing surface provided within the bore of a usual tire tube or tubular tire stem is rigidly controlled by the plug member, so that the ring of packing material on the tubular sealing member is unable to automatically adjust itself to the seat or sealing surface within the tubular tire stem. On the other hand, the above mentioned tire valve heretofore commonly in use, and known as the "Schrader" valve, provides for the self-adjustment or automatic seating of a sealing member having thereon a ring of packing material, but in this construction of tire valve, the valve-closing spring is not housed or protected, and is located in an entirely exposed position below or inwardly from the valve head, where not only is it exposed to damage in shipment, requiring the provision of special packing boxes, but in use this valve-closing spring, because of the fact that it is located inward from the seal produced by the valve head, is contained within the enclosed and sealed and high-pressure air-containing part of the tubular tire stem, where it is exposed to the damaging effect of moisture, oil and dust carried in suspension by the air with which the tire has been inflated and deposited upon this spring. The compression of the air in the tire increases its percentage or proportion of suspensions, such as moisture and dust, as will be readily understood, and the oil comes from the lubrication of the tire pump. These various suspensions eventually clog and corrode the valve-closing spring.

My present invention provides for a flexible self-adjusting swivel connection between an outer tubular screw-threaded swivel member or plug member within which the valve-closing spring is housed, and an inner tubular sealing member having thereon a ring of packing material. Such loose swivel connection provides for limited angular and lateral transverse movements of the sealing member relatively to the plug member, by reason of which such sealing member and packing ring are free to adjust themselves automatically so as to effect a uniform seating and sealing relation of the packing ring with the seat or sealing surface provided within the bore of the tubular tire stem. Also in my present invention it is to be noted that the valve-closing spring is located outward from the seal produced by the valve head seating upon a valve seat provided upon the sealing member, being housed within the tubular plug member outward from the outer end of the tubular sealing member and therefore outside the sealed high-pressure air-containing part of the tire. My invention therefore includes a construction providing for such loose self-adjusting swivel connection together with the outward location and housing of the valve-closing spring. My invention also includes various features of construction and combinations of parts, as will appear from the following description.

I shall now describe the tire valve embodying my invention illustrated in the accompanying drawings and shall thereafter point out my invention in a claim.

Figure 1:
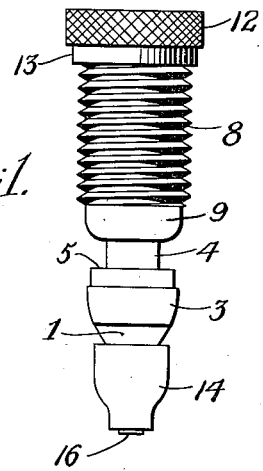
Figure 1 is an elevation and Figure 2 a central longitudinal section of a tire valve embodying my invention.
Figure 2:
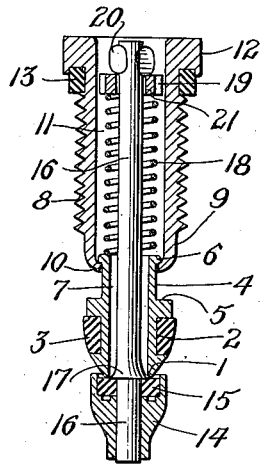

In the embodiment of my invention illustrated in the accompanying drawings, there is shown a metallic tubular sealing member having at its inner end a tapered valve seat 1 outward from which there is provided as shown, an annular groove 2 which contains an inwardly tapered packing ring 3 of suitable material. At its outer end beyond the packing containing groove 2 the tubular sealing member is provided with a short reduced neck 4 inward from which there is provided a rather broad shoulder 5, and the neck 4 terminates in a small annularly projecting flange 6. The tubular sealing member is shown as having a bore 7 of uniform diameter extending longitudinally through it from end to end thereof.

A tubular rotative plug member is provided having a middle externally screw-threaded part 8 below or inward from which there is a comparatively short smooth or un-threaded tubular part 9 which at its lower or inner end is swaged or turned inward to provide an internal annular flange 10 which loosely engages around the neck 4 of the tubular sealing member between the thrust-receiving shoulder 5 thereof and the terminal flange 6 provided thereon. This plug member has a smooth cylindrical bore 11 extending outward from the inner annular flange 10 to the outer end of this plug member, this bore 11 being of somewhat larger diameter than the terminal flange 6 of the neck 4 so as to provide a loose engagement therewith. It will now be clear that the swivel connection between the tubular screw-threaded plug member and the tubular sealing member not only provides for relative rotative movement of these parts but also provides for a limited amount of relative transverse movement, including lateral shifting movement of the tubular sealing member relatively to the plug member and also including angular shifting movement of the tubular sealing member relatively to the plug member. The screw-threaded tubular plug member is adapted to project from the outer end of a usual tubular tire stem and this outer end of the screw-threaded tubular plug member is provided with a knurled head 12 for convenient manipulation, and beneath or inward from this knurled head 12 there is shown a ring 13 of packing material.

A cup-shaped valve head 14 contains a suitable sealing disc 15 which is adapted to cooperate with the valve seat 1 at the inner end of the tubular sealing member to provide a seal at this point. The valve head 14 is carried by the inner end of a valve pin 16, which valve pin passes through the sealing disc 15 and immediately outward from this sealing disc is provided with an outwardly tapered guiding shoulder 17. The valve stem 16 extends outward through the bore 7 in the sealing member, and continues outward from the outer end of this sealing member into the bore 11 of the screw-threaded tubular plug member, and is of such length that, when the internal inner terminal flange 10 of the screw-threaded plug member is in engagement with the shoulder 5 of the sealing member, the outer end of the valve pin 16 will project slightly from the outer end of the bore 11 of the plug member and beyond the knurled head 12, as appears in Figures 3 and 4 of the drawings.

A valve-closing spring 18 is completely housed within the bore 11 of the screw-threaded plug member and is shown as a coiled compression spring surrounding the valve pin 16 and thrusting at its inner end against the outer end of the neck 4 of the tubular sealing member which terminates in the end flange 6. At its outer end the spring 18 thrusts against a triangular stop plate 19 loosely mounted upon the outer end of the valve pin 16 and held in place thereon by means of small abutments 20 formed by pinching the valve pin 16 adjacent to its outer end, as clearly appears in the drawings. The outer or peripheral ends of the triangular stop plate have a free sliding movement within the bore 11 of the plug member, and this stop plate 19 is provided with a central opening 21 which is of larger diameter than the valve pin 16, so as thereby to provide for lateral movement of the outer end of the valve pin 16 for purposes of self-adjustment, whereby a secure sealing relation will be obtained between the valve seat 1 and the sealing disc 15 of the valve head 14 under the various positions of self-adjustment of the tubular sealing member having thereon the tapered packing ring 3, as will hereinafter more clearly appear.

Figure 3:
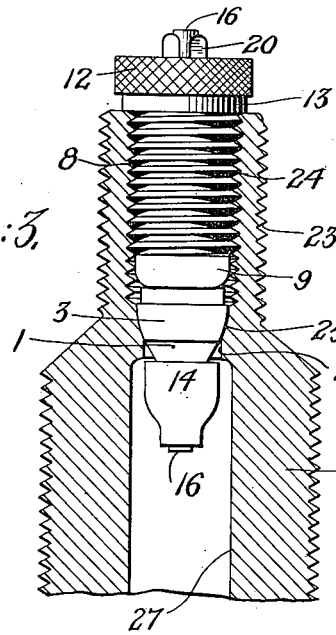
Figure 3 is a central longitudinal section of the outer end of a tubular tire stem with the tire valve of my invention appearing therein in elevation.
Figure 4:
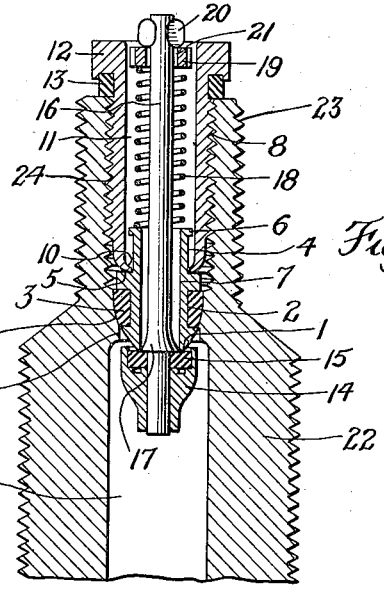
Figure 4 is a similar view with the tire valve appearing in central longitudinal section.
Figure 5:
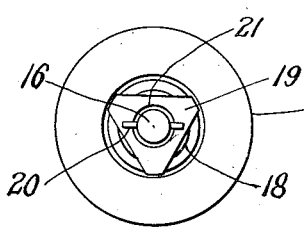
Figure 5 is a slightly enlarged plan view of the tire valve.

In Figures 3 and 4, the tire valve of my invention is shown as combined with a tubular tire stem 22, the outer end only of which is shown. The outer part of this tubular tire stem shown in the drawings is of a usual construction and the remaining or omitted inner part of this tubular tire stem may be of a usual or of any suitable construction. This tubular tire stem 22 is provided with a reduced externally screw-threaded outer end 23 within which there is provided an internally screw-threaded socket 24. Inward from the screw-threaded terminal socket 24 is a tapered sealing surface 25 which is followed by a short reduced bore 26, inward from which there is shown a slightly enlarged bore 27.

Rotation of the projecting knurled head 12 of the tubular plug member to screw its externally screw-threaded middle part 8 into the internally screw-threaded socket 24 of the tubular tire stem 22 will cause the non-rotative tubular valve-carrying sealing member to press the tapered sealing ring or packing ring 3 carried thereby into secure sealing relation with the inwardly tapered sealing surface 25 of the tubular tire stem 22 without rotation of the sealing ring or packing ring 3; and the hereinbefore described loose swivel connection of the tubular sealing member with the tubular plug member, in which the inturned terminal flange 10 at the inner end of the screw-threaded plug member fits loosely around the neck 4 of the tubular sealing member, and also the loose fit of the external outer terminal flange 6 of the neck 4 within the bore 11 of the tubular plug member, and also the looseness of the outer end of the cylindrical valve pin 16 in the hole 21 of the stop plate 19, permit and provide for the automatic adjustment of the tapered packing ring 3 relatively to the correspondingly tapered sealing surface 25. It is to be noted in this connection that such automatic or self-adjustment of the packing ring 3 carried by the tubular sealing member may take place to a limited but sufficient extent both transversely or laterally, and angularly, so that a perfect seal is assured between the tapered packing ring 3 of the tubular sealing member and the tapered sealing surface 25 in the tubular tire stem 22. When the tubular plug member is screwed into the socket 24, the packing ring 3 is forced into the above described sealing relation with the sealing surface 25 by reason of the thrusting engagement of the internal flange 10 of the plug member against the shoulder 5 of the tubular sealing member, as clearly appears in Figures 3 and 4 of the drawings. The smooth or unthreaded part 9 of the tubular plug member is of assistance in starting to screw this plug member into the socket 24, and the long screw-threaded part 8 of the tubular plug member is effective to prevent crossing of the screw-threads.

When the tapered packing ring 3 is in sealing relation with the tapered sealing surface 25 the outer sealing ring or packing ring 13 forms a second seal between the knurled head 12 and the outer end of the reduced part 23 of the tubular tire stem 22, as appears in Figures 3 and 4 of the drawings. However, the arrangement is such that the packing 3 on the tubular sealing member seats first and is firmly pressed into engagement with the tapered sealing surface 25 in the tubular tire stem 22, and that the outer packing ring 13 only seats lightly, its chief function being the exclusion of dampness and dust from the screw-threads and from the sealing ring 3.

It is to be noted that the tire valve embodying my invention illustrated in the accompanying drawings and hereinbefore described provides for the automatic correct seating or self-adjustment of the packing ring 3 within the tapered sealing surface 25 in a construction in which the valve-closing spring 18 is completely housed and protected from any danger of being damaged in handling or in shipment, and also in which, by reason of this valve-closing spring 18 being located outwardly beyond the seal produced by the sealing disc 15 at the valve seat 1, this spring 18 is effectually protected against the clogging and corroding effect of detrimental suspensions in the compressed air within the bore 27 of the tubular tire stem 22, which is in direct communication with the inflated tire.

It is obvious that various modifications may be made in the construction shown in the drawings and above particularly described within the principle and scope of my invention.

I claim:

The combination in a tire valve comprising a tubular body, a plug having a valve seat, a valve member having a pin and a spring of an abutment on the outer end of the valve pin, adapted to permit lateral self-adjusting movement of the outer end of the valve pin in the plug member, said abutment being in the form of a plate having therein an aperture of larger diameter than the valve pin and through which the valve pin loosely passes for lateral self-adjusting movement relative thereto.

In testimony whereof, I have affixed my signature to this specification.

ALBERT B. NORWALK.